US007701874B2

(12) United States Patent
Kline et al.

(10) Patent No.: US 7,701,874 B2
(45) Date of Patent: Apr. 20, 2010

(54) INTELLIGENT SENSOR NETWORK

(75) Inventors: Eric V. Kline, Clinton Corners, NY (US); Harsaran S. Bhatia, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1345 days.

(21) Appl. No.: 11/160,216

(22) Filed: Jun. 14, 2005

(65) Prior Publication Data

US 2006/0280129 A1    Dec. 14, 2006

(51) Int. Cl.
*H04L 12/28* (2006.01)
(52) U.S. Cl. .................. 370/254; 370/400; 340/539.26
(58) Field of Classification Search ........................ None
See application file for complete search history.

(56) References Cited

U.S. PATENT DOCUMENTS

| | | | |
|---|---|---|---|
| 5,005,142 | A | 4/1991 | Lipchak et al. |
| 5,202,661 | A | 4/1993 | Everett, Jr. et al. |
| 5,907,559 | A | 5/1999 | Shuman et al. |
| 6,013,108 | A | 1/2000 | Karolys et al. |
| 6,449,382 | B1 | 9/2002 | Ciccolo et al. |
| 2002/0050931 | A1 | 5/2002 | Lieberman et al. |
| 2003/0023534 | A1 | 1/2003 | Kadambe |
| 2003/0073406 | A1 | 4/2003 | Benjamin et al. |
| 2003/0114986 | A1 | 6/2003 | Padmanabhan et al. |
| 2003/0179084 | A1 | 9/2003 | Skrbina et al. |
| 2004/0028023 | A1 | 2/2004 | Mandhyan et al. |
| 2004/0064260 | A1 | 4/2004 | Padmanabhan et al. |
| 2005/0207376 | A1* | 9/2005 | Ashwood-Smith et al. .. 370/338 |
| 2006/0013154 | A1* | 1/2006 | Choi et al. .................. 370/312 |
| 2006/0104270 | A1* | 5/2006 | Chen et al. .................. 370/389 |
| 2006/0153154 | A1* | 7/2006 | Yoon et al. .................. 370/338 |
| 2006/0176176 | A1* | 8/2006 | Kang et al. ............. 340/539.26 |
| 2006/0178156 | A1* | 8/2006 | Kim ........................... 455/466 |
| 2006/0239216 | A1* | 10/2006 | Chen et al. .................. 370/310 |

OTHER PUBLICATIONS

L. Venkata, "Routing Algorithm for Large Scale Wireless Sensor Networks", Texas A&M Graduate Studies—Computer Science, Dec. 2004.*
J. Zhang, H. Shi, "Energy-Efficient Routing for 2D Grid Wireless Sensor Networks", In Proceedings of the IEEE International Conference on Information Technology: Research and Education 2003, ITRE 2003, Newark, New Jersy, Aug. 2003.*

(Continued)

*Primary Examiner*—Gregory B Sefcheck
*Assistant Examiner*—Suk Jin Kang
(74) *Attorney, Agent, or Firm*—Yuanmin Cai; Hoffman Warnick LLC

(57) ABSTRACT

The present invention provides a method, system, and program product for the deployment and use of an intelligent sensor network. More particularly, the method, system, and program product of the present invention enable the deployment and use of fused sensors in an arbitrary area or volume. In a first aspect, the invention provides a method for employing a multi-sensor network, the method comprising the steps of employing a first sensor, employing a plurality of additional sensors, a position of each additional sensor within the network being relative in at least two dimensions to only one of the first sensor and an adjacent sensor nearer the first sensor, and employing a routing algorithm for determining a routing path for data in the network.

15 Claims, 7 Drawing Sheets

OTHER PUBLICATIONS

R. Luo, O. Chen, L.C. Tu, "Nodes Localization through Data Fusion in Sensor Network", In Proceedings of the 19th International Conference on Advanced Information Network and Applications, AINA 2005.*

Y. Ge, Q. Yin S.K. Tan Q. Yao B.S. Yao W. Seah, "Green: A Grid-based Energy Efficient Probabilistic Routing in Wireless Sensor Networks", Vehicular Technology Conference 2005, IEEE 61st, 2005.*

Baertlein, Brian, "Progress in Sensor Fusion and IR Modeling at Ohio State University," Research on Demining Technologies Joint Workshop, European Commission Joint Research Center, Jul. 12-14, 2000, pp. 1-21.

Bevington, James E., et al., "Target Tracking for Heterogeneous Smart Sensor Networks," Proceedings of SPIE, vol. 4396, 2001, pp. 20-30.

"Remote Robotic Reconnaissance Vehicle," R3V, SPAWAR Systems Center San Diego (US Naval Research), 2003, Google Search, pp. 1-5.

* cited by examiner

INTELLIGENT SENSOR NETWORK

BACKGROUND OF THE INVENTION

1. Technical Field

The invention relates generally to the field of data communications and more specifically to a method, system, and program product for the deployment and use of fused sensors in an arbitrary area or volume.

2. Related Art

It has long been recognized that data acquisition and environmental monitoring are improved by the use of multiple sensor devices linked through a network or system. Various parametric and non-parametric multi-sensor data fusion algorithms have been proposed for combining data from multiple sensor devices in such a network or system. See, e.g., Ma, "Parametric and non-parametric approaches for multi-sensor data fusion," Ph.D. Thesis, University of Michigan (2001), which is hereby incorporated herein by reference.

The ability to deploy and use a wide variety of sensor devices over an arbitrary area or in an arbitrary volume offers great advantages in various applications, and particularly in intelligence, surveillance and reconnaissance (ISR) applications. For example, Bevington et al. describe distributed sensor networks useful for battlefield surveillance and target tracking and that are capable of adaptation and self-organization. See Bevington et al., "Target Tracking for Heterogeneous Smart Sensor Networks," in Battlespace Digitization and Network-Centric Warfare, Proceedings of SPIE v.4396 (2001), which is hereby incorporated herein by reference. Other uses for multi-sensor systems may include, for example, the location and tracking of individuals or vehicles, security systems, wireless telecommunications and data transfer systems, and environmental monitoring applications.

However, it is often a lack of robustness or adaptability of the networks or systems within which these sensors operate that prevents realization of the full potential of multi-sensor data fusion technologies. Many such networks or systems are fixed or static. For example, U.S. Patent Application Publication No. 2004/0064260 to Padmanabhan et al., which is hereby incorporated herein by reference, teaches a static sensor network for the detection of biological and chemical agents. Others require information to be routed through a fixed central point. For example, U.S. Patent Application Publication No. 2003/0073406 to Benjamin et al., which is hereby incorporated herein by reference, teaches a mobile, dynamic network of vehicle-mounted sensors that communicate via a centralized communications controller. In such a network, the failure of the centralized data routing point or any sensor along the path to that point may render some or all of the network inoperable. This inoperability may result not only in the inability of the network to fuse the data provided by multiple sensors, but may also isolate individual sensors with respect to each other. In military applications, such isolation of network components can have disastrous consequences.

There is, therefore, a need in the art for a solution that employs a wide variety of sensors over an arbitrary area or volume, permits the rapid transmission and acquisition of data, and is dynamically reconfigurable.

SUMMARY OF THE INVENTION

The present invention provides a method, system, and program product for the deployment and use of an intelligent sensor network. More particularly, the method, system, and program product of the present invention enable the deployment and use of fused sensors in an arbitrary area or volume.

In a first aspect, the invention provides a method for employing a multi-sensor network, the method comprising the steps of employing a first sensor, employing a plurality of additional sensors, a position of each additional sensor within the network being relative in at least two dimensions to only one of the first sensor and an adjacent sensor nearer the first sensor, and employing a routing algorithm for determining a routing path for data in the network.

In a second aspect, the invention provides a system for employing a multi-sensor network, the system comprising means for employing a first sensor, means for employing a plurality of additional sensors, a position of each additional sensor within the network being relative in at least two dimensions to only one of the first sensor and an adjacent sensor nearer the first sensor, and means for employing a routing algorithm for determining a routing path for data in the network.

In a third aspect, the invention provides a computer readable medium comprising computer program code embodied therein for employing a multi-sensor network, the program product comprising program code for employing a first sensor, program code for employing a plurality of additional sensors, a position of each additional sensor within the network being relative in at least two dimensions to only one of the first sensor and an adjacent sensor nearer the first sensor, and program code for employing a routing algorithm for determining a routing path for data in the network.

BRIEF DESCRIPTION OF THE DRAWINGS

Illustrative embodiments of this invention will be described in detail, with reference to the following figures, wherein like designations denote like elements, and wherein.

It is noted that the drawings of the invention are not to scale. The drawings are intended to depict only typical aspects of the invention, and therefore should not be considered as limiting the scope of the invention.

DETAILED DESCRIPTION

Figure 1:
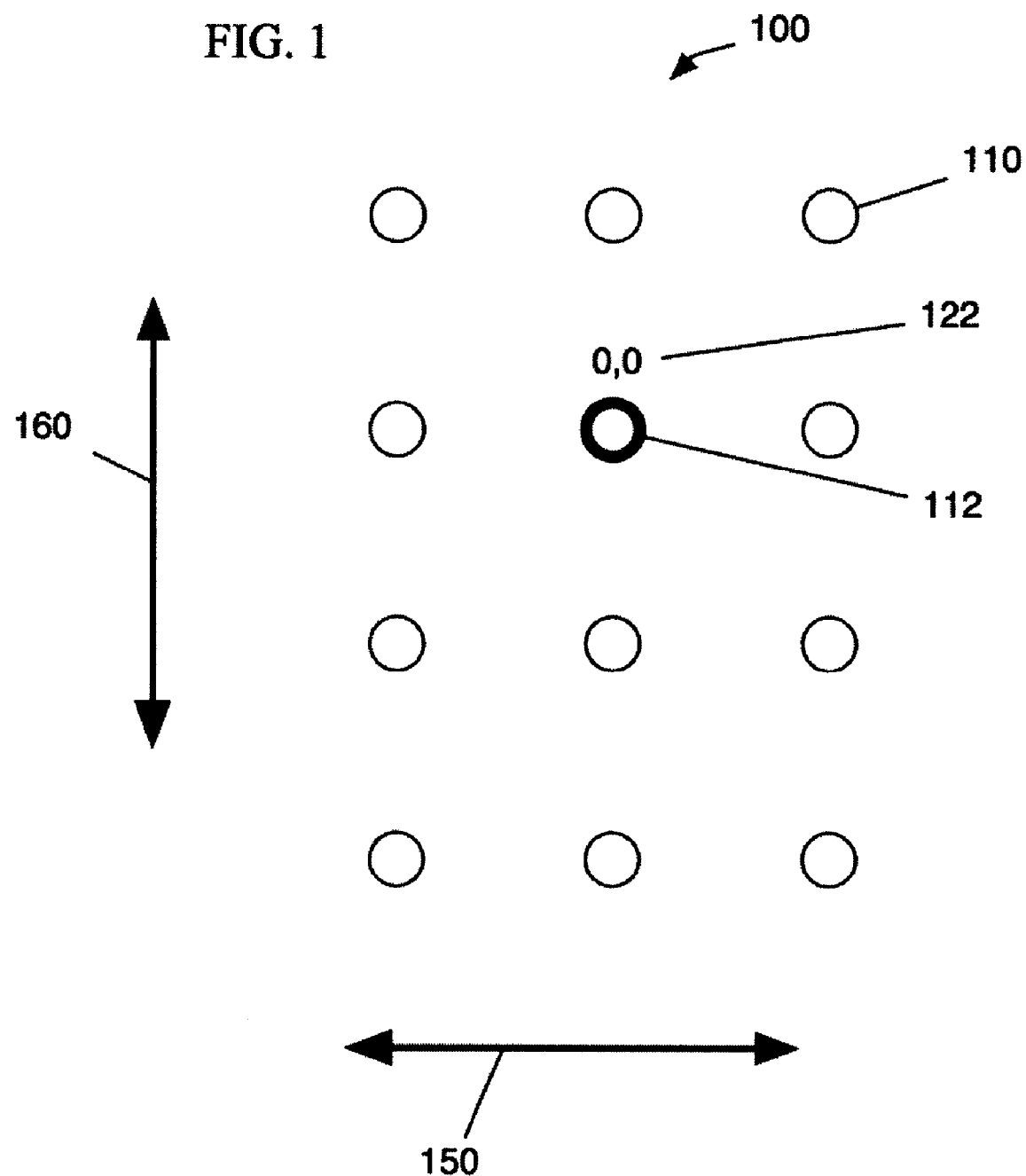
FIG. 1 shows a multi-sensor network according to the invention.

Referring to FIG. 1, a two-dimensional network 100 of sensors (e.g., network nodes) 110, 112 is shown. Sensors 110, 112 include any device capable of acquiring and/or transmitting data relating to an environmental or situational state. Suitable sensors include, for example, devices capable of acquiring and/or transmitting acoustical, visual, positional, directional, motion, temporal, vibrational, seismic, electrical, magnetic, thermal, chemical, biological, or radiological data. Upon deployment of a first sensor 112, additional sensors 110 deployed within the network 100 are positioned along a first axis 150 and a second axis 160 relative to only one of first sensor 112 or an adjacent sensor nearer first sensor 112. That is, first sensor 112 functions as the origin of the network, having coordinates 122 of (0,0). All subsequently deployed sensors 110 have coordinates ultimately relative to first sensor 112, although actual determination of a sensor's coordinates is made either by direct comparison to first sensor 112 or by comparison to an adjacent sensor nearer first sensor 112, the coordinates of which have already been determined. Axes 150, 160 are arbitrary and relative only to each other and defined upon placement of first sensor 112. A user may choose, for example, to align axes 150, 160 with cardinal directions or any other orientation the user prefers. A default orientation for axes 150, 160 may similarly be employed.

All data acquired by a sensor 110 are routed to first sensor 112 via the nearest adjacent sensor. Such routing is done according to an algorithm of orthogonal shifts within the network 100 of sensors 110, 112 such that each transmission of data to the nearest adjacent sensor moves the data closer to first sensor 112 while maintaining the greatest possible coordinate distance from first sensor 112. Such an algorithm ensures that data transmission within the network utilizes as many "straight line" transmissions as possible.

Data routed to first sensor 112 is then provided to a system, network, or device external to sensor network 100. That is, first sensor 112 serves as a portal to other systems, networks, or devices capable of utilizing data acquired by sensor network 100. Suitable systems, networks, and devices include, for example, communications systems and networks, weapons systems, display devices, and recording devices.

Figure 2:
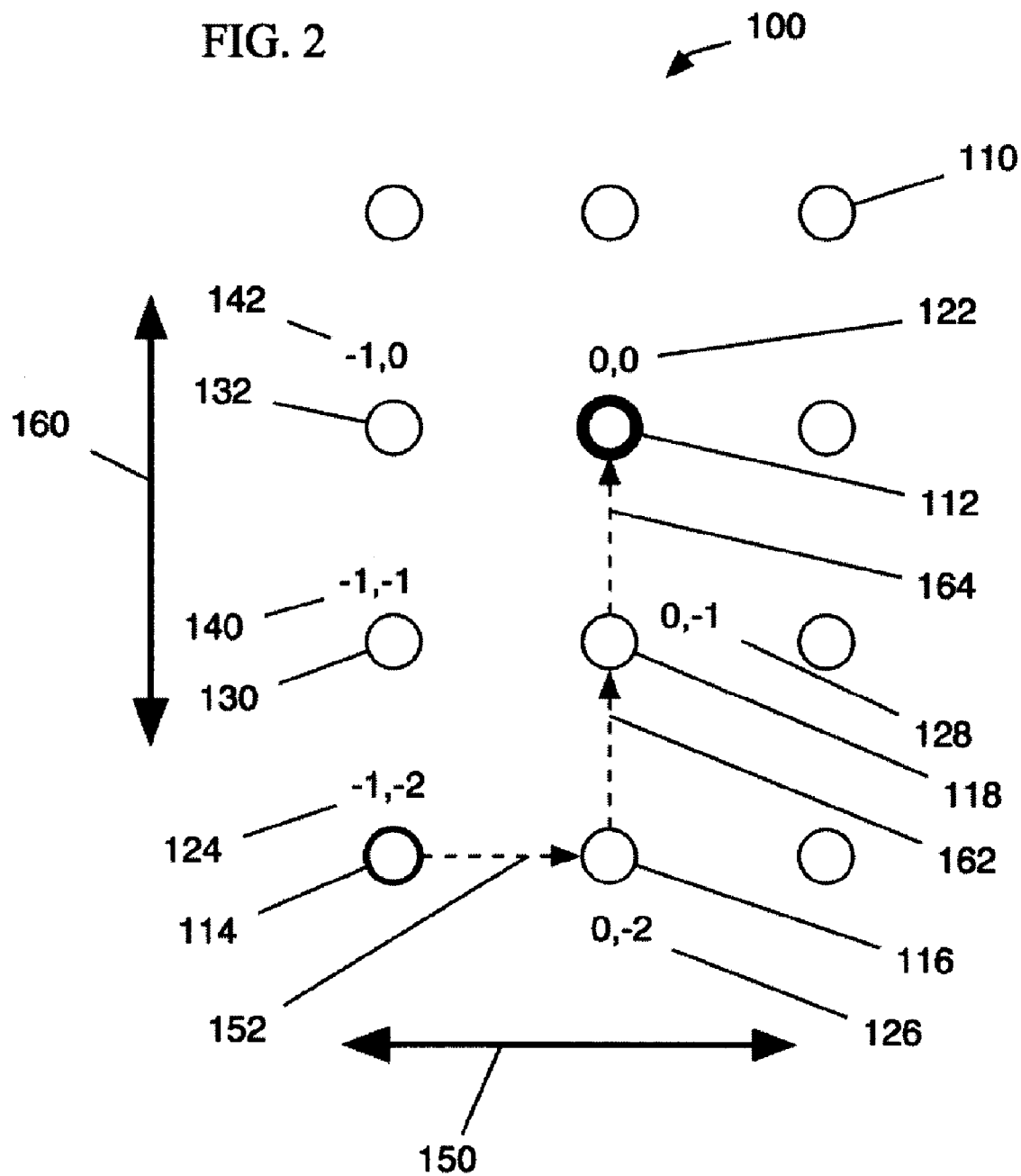
FIG. 2 shows a data routing path within the network of FIG. 1.

Referring now to FIG. 2, an activated sensor 114 has received data. Numerous pathways are possible for transmitting the data to first sensor 112. According to the algorithm of the present invention, the nearest sensors adjacent activated sensor 114 are first determined. Here, the nearest adjacent sensors to activated sensor 114 are sensor 116 and sensor 130. Next, the nearest adjacent sensor that maintains a maximum distance from first sensor 112 is chosen. Here, that sensor is sensor 116, having coordinates 126 of (0,−2). Sensor 130, having coordinates 140 of (−1,−1), is not chosen, as it is closer to first sensor 112 along axis 160 than is sensor 116. Accordingly, data is first transferred 152 to sensor 116 along axis 150. From sensor 116, transmission to first sensor 112 is a "straight line" transfer, i.e. along a single axis 160. Data is second transferred 162 to sensor 118 having coordinates 128 (0,−1) and third transferred 164 to first sensor 112.

In the example of FIG. 2, it is also possible to route the data acquired by sensor 114 to first sensor 112 using the same number of orthogonal shifts and "straight line" transmissions by first transmitting data to sensor 130, then to sensor 132, having coordinates 142 of (−1,0), and finally to first sensor 112. In the example of FIG. 2, such a routing path would be as efficient as that preferred by the algorithm of the present invention. However, as network 100 increases in size and sensors 110 lie further from first sensor 112, routing paths other than those preferred by the algorithm of the present invention may not maintain the efficiencies of minimized orthogonal shifts and "straight line" transmissions described above.

In the event that more than one routing path is a preferred routing path according to the algorithm of the present invention, a user definable axis preference may be included in the algorithm. For example, still referring to FIG. 2, if sensor 130 was the activated sensor, two routing paths will satisfy the algorithm's requirements that the first transmission move the data closer to first sensor 112 while maintaining a maximum distance from first sensor 112. Specifically, the two routing paths are: (1) sensor 130 to sensor 132 to first sensor 112 and (2) sensor 130 to sensor 118 to first sensor 112. In such a circumstance, an axis will be defined by a user as the preferred axis for first transmission. For example, if the preferred axis was axis 150, the routing path chosen by the algorithm would be path (2), above.

In addition to the efficiencies in data transfer described above, the present invention provides a robust, intelligent, and adaptable multi-sensor network. That is, unlike the networks known in the art, which generally depend upon uninterrupted routing paths to transmit data, the network of the present invention adapts its routing paths in response to the unavailability of individual sensors. This robustness and adaptability is critical in military applications, where communications and data acquisition networks must be able to continue functioning following the inactivation or destruction of one or more individual network sensors. Other networks may similarly benefit from the robustness and adaptability of the present invention, including, for example, high-speed Internet or telecommunications networks and environmental monitoring networks.

Figure 3:
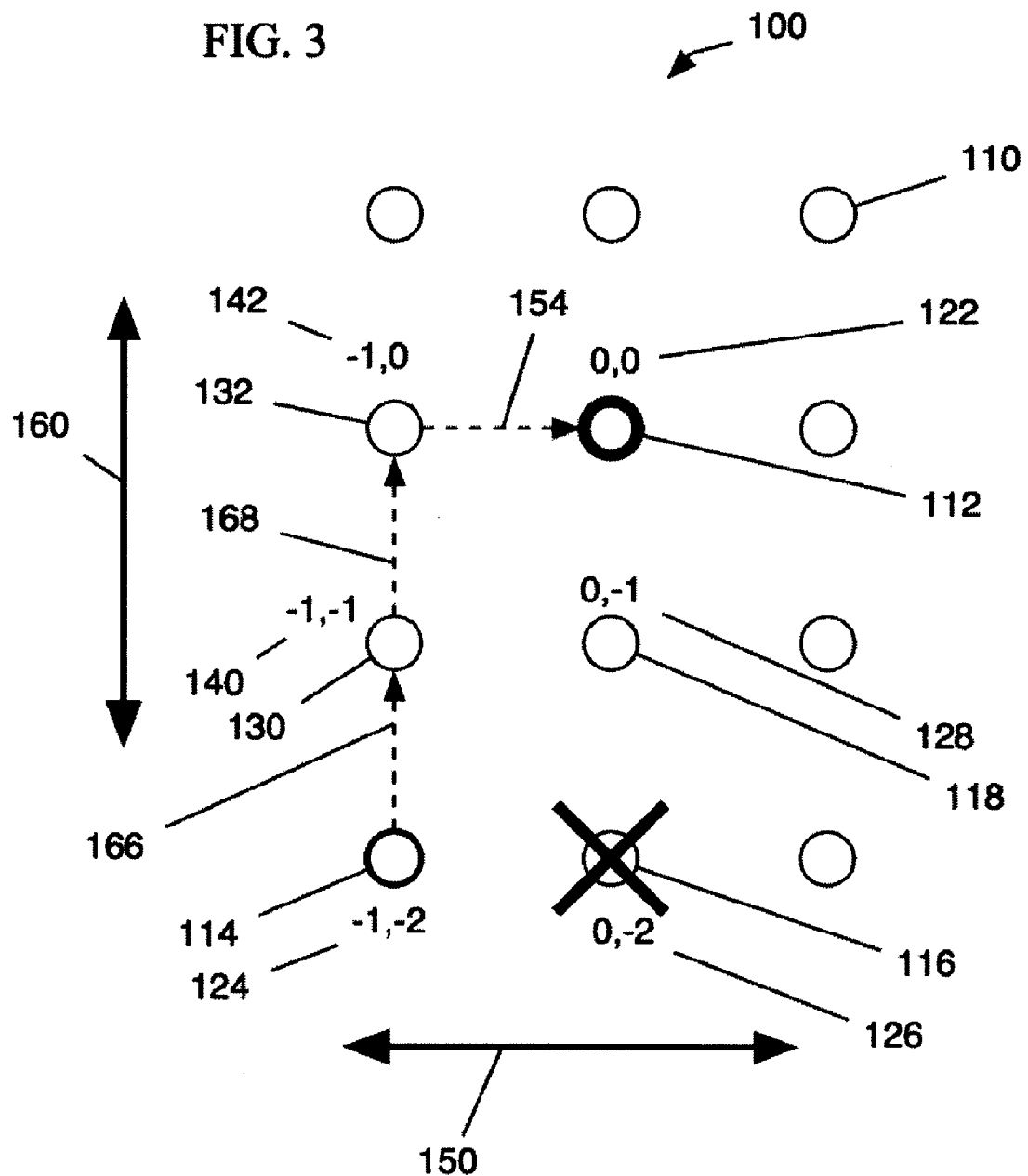
FIG. 3 shows an adaptive data routing path within the network of FIG. 1.

For example, referring to FIG. 3, sensor 116 is again the sensor preferred by the algorithm, but is unavailable to transmit data received by sensor 114. This unavailability may be due to damage to or destruction of sensor 116 or may simply be due to its occupation with the transmission of data from another sensor. According to the algorithm of the present invention, the preferred routing path will adapt to bypass sensor 116. The only remaining sensor within network 100 that satisfies the algorithm's criteria (i.e. that the first transmission move the data closer to first sensor 112 while maintaining a maximum distance from first sensor 112) is sensor 130. Thus, where sensor 116 is unavailable, the algorithm of the present invention will follow routing path (2) described above with respect to FIG. 2. Specifically, the data from sensor 114 is first transferred 166 to sensor 130 and second transferred 168 to sensor 132 along axis 160. Finally, via an orthogonal shift, data is third transferred 154 to first sensor 112 along axis 150. While the network show in FIGS. 1-3 comprises two dimensions, it should be recognized that the teachings of the present invention are equally applicable to three-dimensional networks.

Figure 4:
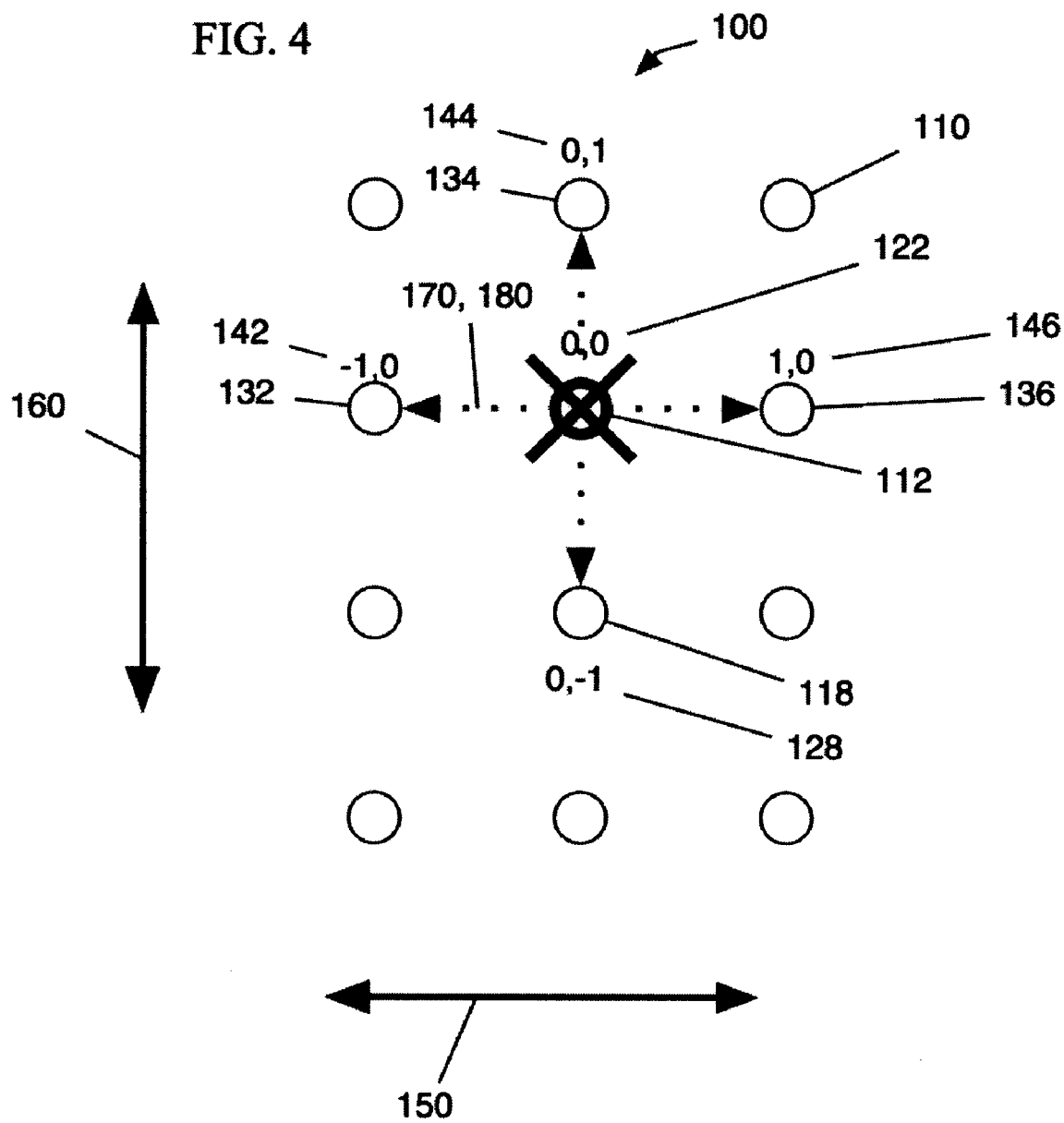
FIG. 4 shows a sensor network with an adaptable central node.

Referring to FIG. 4, it is possible that first sensor 112 will become disabled or otherwise unavailable. For at least two reasons, such an occurrence is more problematic than the unavailable sensor in FIG. 3, as described above. First, since all routing paths ultimately lead to first sensor 112, it is not possible to utilize an alternate routing path that does not include first sensor 112. Second, as described above, first sensor 112 acts as the portal to other systems, networks, or devices capable of utilizing data acquired by sensor network 100. Thus, if first sensor 112 is unavailable, all data acquired by sensor network 100 is also unavailable to such other systems, networks, or devices.

Accordingly, in a preferred embodiment of the present invention, a sensor 110 other than first sensor 112 is capable of functioning as the network portal to other systems, networks, or devices, should first sensor 112 become unavailable. As a preferred method of achieving this end, first sensor 112, when it is functioning properly, transmits a status signal 170 to each sensor 118, 132, 134, 136 nearest first sensor 112. Status signal 170 may be transmitted in any number of manners, including, for example, continuously or periodically. While status signal 170 is received by sensors 118, 132, 134, 136, first sensor 112 continues to act as the network portal. However, if status signal 170 is not received by sensors 118, 132, 134, 136 or is received in a sufficiently poor quality that first sensor 112 is no longer capable of functioning satisfactorily as the network portal, a sensor nearest first sensor 112 will assume the role of the network portal. In another preferred embodiment, rather than transmitting a status signal 170, first sensor 112 transmits an "unavailable" signal 180 upon becoming unavailable.

As can be seen in FIG. 4, four sensors 118, 132, 134, 136 are equally near first sensor 112. In a three-dimensional sensor network, as many as six sensors may be equally near first sensor 112. Accordingly, some method must be employed to choose a sensor to function as the new network portal from among those sensors equally near first sensor 112. As described above, use of a user definable axis preference will limit the sensors from among which the new network portal must be chosen to a maximum of two. To chose between this maximum of two, a user definable polarity preference may be similarly employed, whereby the preferred sensor is the one which lies on the "positive" or "negative" side of the chosen axis. For example, still referring to FIG. 4, if first axis 150 is the preferred axis, the sensor to function as the new network portal will be chosen from among sensor 132 and sensor 136. If the preferred polarity is "positive," sensor 136 will be chosen, as it lies on the "positive" side of first axis 150, relative to first sensor 112.

Upon assuming the function of network portal, the coordinates of the chosen sensor (e.g., sensor 136 in the example above) are redesignated 0,0 and the coordinates of all remaining sensors in network 100 are redesignated relative to the chosen sensor. For example, upon being chosen as the new network portal, the coordinates 146 of sensor 136 are redesignated from 1,0 to 0,0 while the coordinates 142 of sensor 132 are redesignated from −1,0 to −2,0, the coordinates 144 of sensor 134 are redesignated from 0,1 to −1,1, etc.

Figure 5:
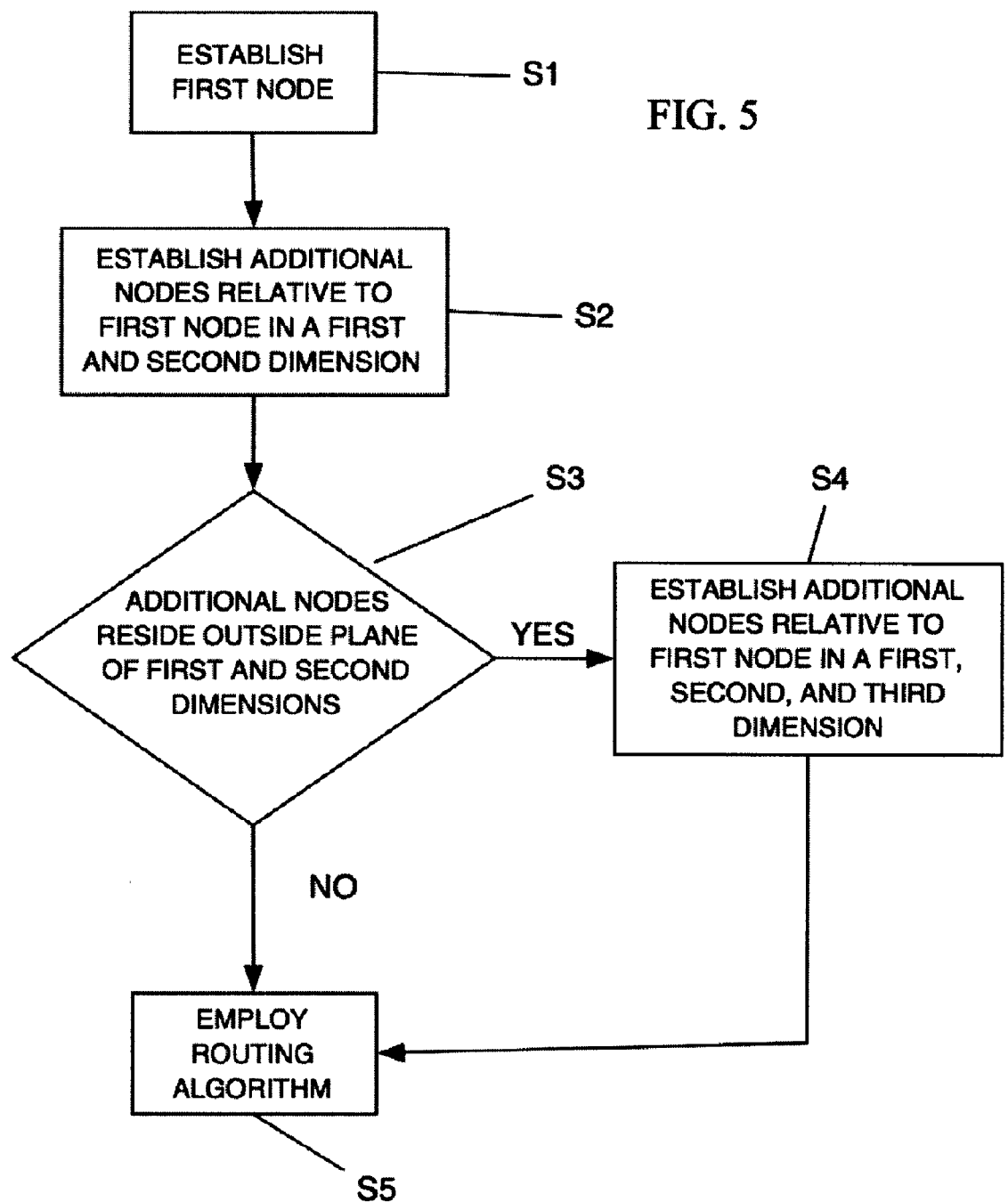
FIG. 5 shows a flow chart of a method for employing a network according to the invention.

Referring now to FIG. 5, a flow chart is shown for a method of employing a network according to the invention. At step S1, a first network node (first sensor 112 in FIGS. 1-4) is established. As described above, the network of the present invention has a physically arbitrary architecture, such that the establishment of the first node is independent of any axes, which will be defined relative to the first node. At step S2, additional nodes are established relative only to the first node in a first and second dimension. It is possible to establish at least two additional nodes that reside within a two-dimensional plane relative to the first node. However, additional nodes in excess of two (i.e., the fourth or greater node added to the network) may reside outside this two-dimensional plane. Accordingly, at step S3, it is determined whether any additional nodes reside outside the two-dimensional plane relative to the first node. If no network nodes reside outside this two-dimensional plane, the routing algorithm described above is employed at step S5 to determine a data routing path to be followed in the transmission of data from an activated node to the first node. If, however, one or more nodes reside outside the two-dimensional plane relative to the first node, at step S4, the position of all nodes must is determined in a third dimension relative to the first node. After so determining the position of each node, the routing algorithm is employed at step S5 as above.

Figure 6:
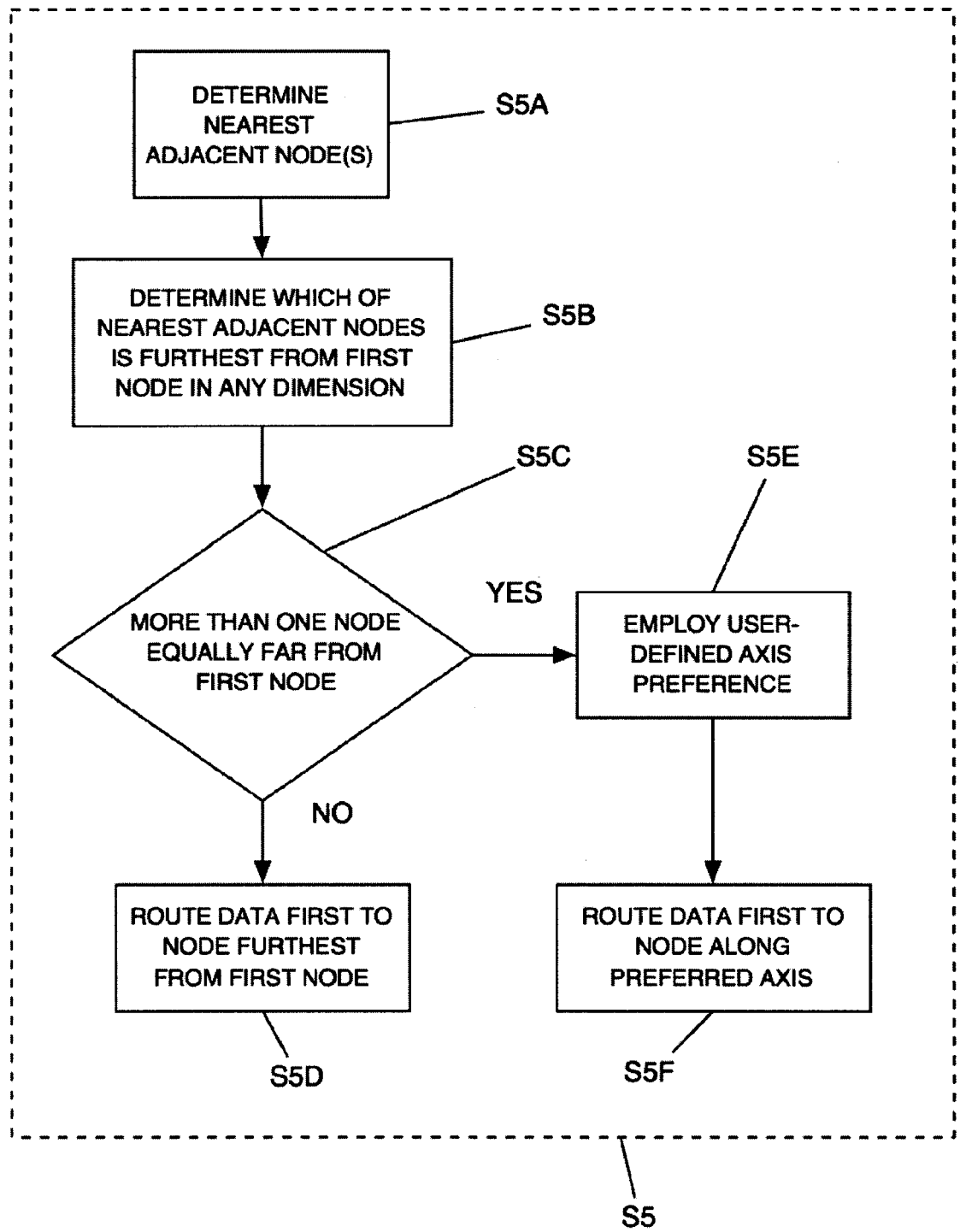
FIG. 6 shows a flow chart of a routing algorithm according to the invention.

FIG. 6 shows a flow chart for the routing algorithm of step S5 in FIG. 5. At step S5A, the nearest node(s) (e.g., sensor(s)) adjacent an activated node is determined. At step S5B, it is determined which of the nodes of step S5A is furthest from the first node in any direction (i.e., along any of a fist, second, or third axis). Next, at step S5C, it is determined whether more than one node is identified at step S5B. That is, as described above, it is possible that more than one nearest adjacent node will be equally distant from the first node. If only one node is identified at step S5B, i.e., the answer at step S5C is "No," at step S5D, the data is first routed to the node identified at step S5B. If, however, more than one node is identified at step S5B, a user-defined axis preference is employed at step S5E. Accordingly, at step S5F, data is first routed to the node along the preferred axis.

Thus, networks employed according to the present invention are robust, intelligent, and adaptable due to the use of an ad hoc routing algorithm. This algorithm enables the efficient transmission of data via network nodes by preferring routing paths that minimize orthogonal shifts, maximize "straight line" transmissions, and route around nodes as they become unavailable for data transmission.

Figure 7:
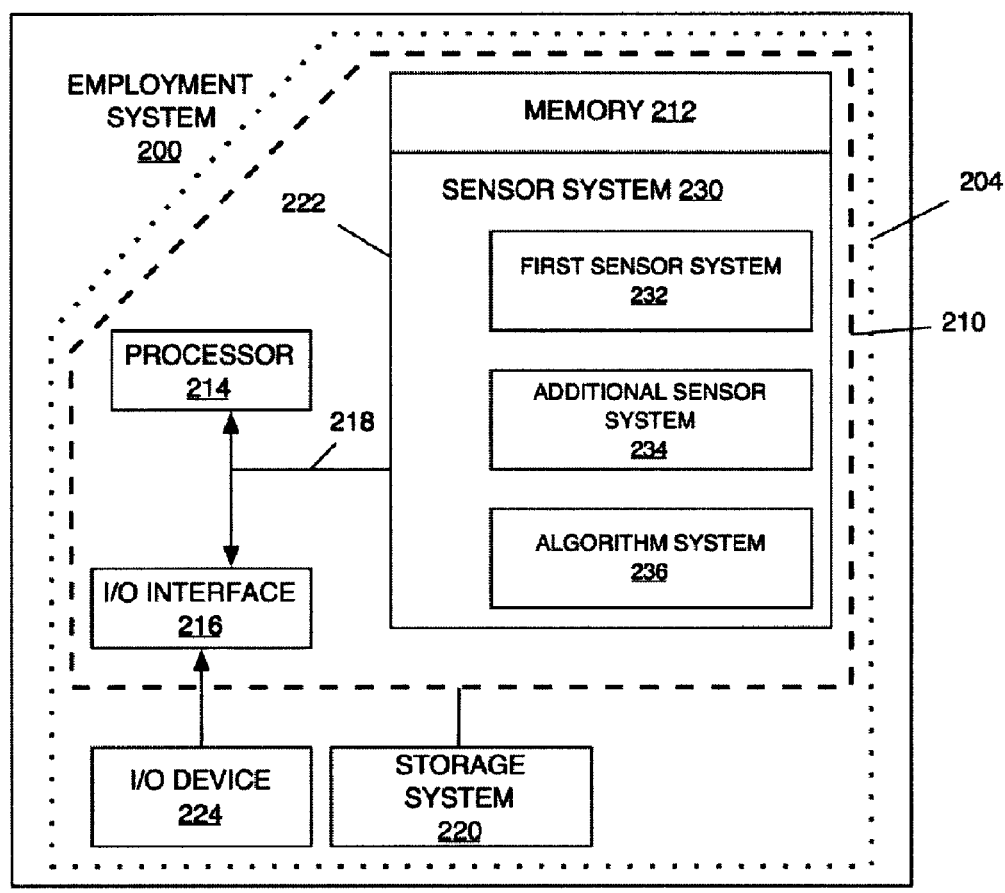
FIG. 7 shows a diagram of a system for employing a multi-sensor network according to the invention.

FIG. 7 is a block diagram of a system 200 capable of employing a multi-sensor network in accordance with the invention. System 200 includes a computing device 210 having a memory 212, a processor 214, an input/output (I/O) interface 216, and a bus 218. Computing device 210 is shown in communication with an external I/O device/resource 224 and a storage system 220, which together comprise a computer infrastructure 204. As is known in the art, in general, processor 214 executes computer program code such as sensor system 230, that is stored in memory 212 and/or storage system 220. While executing computer program code, processor 214 can read and/or write data, such as that of sensor system 230, to/from memory 212, storage system 220, and/or I/O interface 216. Bus 218 provides a communication link between each of the components in computing device 210. I/O device 224 may comprise any known type of device that enables a user to interact with computing device 210 or any device that enables computing device 210 to communicate with one or more other computing devices, including a network system, modem, keyboard, mouse, scanner, voice recognition system, CRT, printer, disc drive, etc. Additional components, such as cache memory, communication systems, system software, etc., may also be incorporated into system 200.

In any event, computing device 210 can comprise any general purpose computing article of manufacture capable of executing computer program code installed by a user (e.g., a personal computer, server, handheld device, etc.). However, it is understood that computing device 210 and sensor system 230 are only representative of various possible computing devices that may perform the various process steps of the invention. To this extent, in other embodiments, computing device 210 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, employment system 200 is only illustrative of various types of systems for implementing the invention. For example, system 200 may comprise two or more computing devices (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.).

As previously mentioned, sensor system 230 enables computing device 210 to employ a multi-sensor network. To this extent, sensor system 230 is shown including a first sensor system 232, an additional sensor system 234, and an algorithm system 236. It should be understood that some of the various systems of FIG. 6 can be implemented independently, combined, and/or stored in memory for one or more separate computing devices 210 that communicate over a network. Further, is should be understood that some of the systems and/or functionality may not be implemented, or additional systems and/or functionality may be included as part of system 200.

While shown and described herein as a method and system for employing a multi-sensor network, it is understood that the invention further provides various alternative embodiments. For example, in one embodiment, the invention provides a computer-readable medium that includes computer program code to enable a computer infrastructure to employ a multi-sensor network. To this extent, the computer-readable medium includes program code, such as sensor system 230, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 212 and/or storage system 220 (e.g., a fixed disk, a read-only memory, a random access memory, a cache memory, etc.).

In still another embodiment, the invention may provide a method for generating a system for employing a multi-sensor network. In this case, a computer infrastructure, such as computer infrastructure 204, can be obtained (e.g., created, maintained, having been made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as computing device 210, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it should be understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more types of program products, such as an application/software program, component software/a library of functions, an operating system, a basic I/O system/driver for a particular computing and/or I/O device, and the like.

It should be appreciated that the teachings of the present invention could be offered as a business method on a subscription or fee basis. For example, an employment system 200 could be created, maintained and/or deployed by a service provider that offers the functions described herein for customers. That is, a service provider could offer to employ a multi-sensor network as described above.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for employing a multi-sensor network, the method comprising the steps of:
    employing a first sensor, wherein the employing the first sensor includes establishing the first sensor as a network portal;
    employing a plurality of additional sensors, a position of each additional sensor within the network being relative in at least two dimensions to only one of the first sensor and an adjacent sensor nearer the first sensor; and
    employing a routing algorithm for determining a routing path for data located at an activated sensor in the network,
    wherein the routing algorithm determines the nearest adjacent sensors to the activated sensor, determines which of the nearest adjacent sensors is furthest from the first sensor in any dimension, employs a user-defined axis preference for determining an axis along which the data is first routed from the activated sensor in response to determining that there is more than one sensor that is equally far from the first sensor, moves the data from the activated sensor along a routing path closer towards the first sensor while maintaining a maximum coordinate distance from the first sensor in order to minimize orthogonal shifts in data between sensors in the network, maximize straight line transmissions of data along a single axis for the sensors in the network and route data around sensors in the network that become unavailable for data transmission,
    wherein at least one of the plurality of additional sensors in the network functions as a network portal in response to the first sensor becoming unavailable.

2. The method of claim 1, wherein the employing a routing algorithm includes routing data from any one of the plurality of additional sensors to the first sensor.

3. The method of claim 1, wherein the employing a routing algorithm includes routing data from any one of the plurality of additional sensors to the first sensor through another of the plurality of additional sensors.

4. The method of claim 1, wherein the employing a routing algorithm includes determining a routing path having at least one orthogonal shift.

5. The method of claim 4, wherein the at least one orthogonal shift routes the data closer to the first sensor while maintaining a greater distance from the first sensor.

6. The method of claim 1, wherein the employing a routing algorithm includes determining a routing path that excludes a non-functional sensor.

7. The method of claim 1, further comprising acquiring at least one of acoustical, visual, positional, directional, motion, temporal, vibrational, seismic, electrical, magnetic, thermal, chemical, biological, or radiological data using at least one sensor.

8. A system for employing a multi-sensor network, the system comprising:
    means for employing a first sensor wherein the employing the first sensor includes establishing the first sensor as a network portal;
    means for employing a plurality of additional sensors, a position of each additional sensor within the network being relative in at least two dimensions to only one of the first sensor and an adjacent sensor nearer the first sensor; and means for employing a routing algorithm for determining a routing path for data located at an activated sensor in the network, wherein the routing algorithm determines the nearest adjacent sensors to the activated sensor, determines which of the nearest adjacent sensors is furthest from the first sensor in any dimension, employs a user-defined axis preference for determining an axis along which the data is first routed from the activated sensor in response to determining that there is more than one sensor that is equally far from the first sensor, moves the data from the activated sensor along a routing path closer towards the first sensor while maintaining a maximum coordinate distance from the first sensor in order to minimize orthogonal shifts in data between sensors in the network, maximize straight line transmissions of data along a single axis for the sensors in the network and route data around sensors in the network that become unavailable for data transmission, wherein at least one of the plurality of additional sensors functions as a network portal in response to the first sensor becoming unavailable.

9. The system of claim 8, wherein the means for employing a routing algorithm includes means for routing data from any one of the plurality of additional sensors to the first sensor.

10. The system of claim 8, wherein the means for employing a routing algorithm includes means for routing data from any one of the plurality of additional sensors to the first sensor through another of the plurality of additional sensors.

11. The system of claim 8, wherein the means for employing a routing algorithm includes means for determining a routing path having at least one orthogonal shift.

12. The system of claim 11, wherein the at least one orthogonal shift routes the data closer to the first sensor while maintaining a greater distance from the first sensor.

13. The system of claim 8, wherein the means for employing the routing algorithm includes means for determining a routing path that excludes a non-functional sensor.

14. The system of claim 8, wherein at least one sensor is a sensor adapted to acquire at least one of acoustical, visual, positional, directional, motion, temporal, vibrational, seismic, electrical, magnetic, thermal, chemical, biological, or radiological data.

15. A computer readable medium comprising computer program code embodied therein for employing a multi-sensor network, the program product comprising:
    program code for employing a first sensor wherein the employing the first sensor includes establishing the first sensor as a network portal;
    program code for employing a plurality of additional sensors, a position of each additional sensor within the network being relative in at least two dimensions to only one of the first sensor and an adjacent sensor nearer the first sensor; and
    program code for employing a routing algorithm for determining a routing path for data located at an activated sensor in the network,
    wherein the routing algorithm determines the nearest adjacent sensors to the activated sensor, determines which of the nearest adjacent sensors is furthest from the first sensor in any dimension, employs a user-defined axis preference for determining an axis along which the data is first routed from the activated sensor in response to determining that there is more than one sensor that is equally far from the first sensor, moves the data from the activated sensor along a routing path closer towards the first sensor while maintaining a maximum coordinate distance from the first sensor in order to minimize orthogonal shifts in data between sensors in the network, maximize straight line transmissions of data along a single axis for the sensors in the network and route data around sensors in the network that become unavailable for data transmission,
    wherein at least one of the plurality of additional sensors functions as a network portal in response to the first sensor becoming unavailable.

* * * * *